(12) United States Patent
Yazaki et al.

(10) Patent No.: US 8,331,242 B2
(45) Date of Patent: *Dec. 11, 2012

(54) POLICING DEVICE

(75) Inventors: Takeki Yazaki, Tokyo (JP); Yuichi Ishikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/654,922

(22) Filed: Jan. 8, 2010

(65) Prior Publication Data

US 2010/0110889 A1    May 6, 2010

Related U.S. Application Data

(63) Continuation of application No. 11/000,881, filed on Dec. 2, 2004, now Pat. No. 7,646,711.

(30) Foreign Application Priority Data

Dec. 3, 2003    (JP) .................................. 2003-403972

(51) Int. Cl.
*H04J 3/16*    (2006.01)
(52) U.S. Cl. ........................................ 370/241; 370/229
(58) Field of Classification Search .................. None
See application file for complete search history.

(56) References Cited

U.S. PATENT DOCUMENTS

| 6,975,630 B1 | 12/2005 | Kusumoto |
| 7,646,711 B2* | 1/2010 | Yazaki et al. ................ 370/230 |
| 2003/0018801 A1* | 1/2003 | Ganti et al. ................... 709/233 |
| 2003/0154272 A1 | 8/2003 | Dillon et al. |
| 2005/0122906 A1 | 6/2005 | Yazaki et al. |
| 2005/0175014 A1* | 8/2005 | Patrick .................... 370/395.43 |
| 2006/0159019 A1 | 7/2006 | Buskirk et al. |

FOREIGN PATENT DOCUMENTS

| CN | 1625157 A | 12/2004 |
| JP | 09-312668 | 5/1996 |
| JP | 10-023059 | 7/1996 |
| JP | 2000-063471 | 8/1998 |
| JP | 2000-349812 | 6/1999 |
| JP | 2001-326688 | 5/2000 |
| JP | 2001-156785 | 6/2001 |
| JP | 2003-046555 | 2/2003 |
| JP | 2003-403972 | 12/2003 |

OTHER PUBLICATIONS

"The ATM Forum Traffic Management Specification Version 4.0", ATM Forum Technical Committee, Apr. 1996, pp. 30.

(Continued)

*Primary Examiner* — Kevin C Harper
(74) *Attorney, Agent, or Firm* — Stites & Harbison, PLLC; Juan Carlos A. Marquez, Esq.

(57) ABSTRACT

A policing device having a table storing monitored bandwidth, packet history information for each importance level, and the allocation weight of the monitored bandwidth for each importance level, a policing table control circuit for reading out these items of information into each storage of a policing unit when a packet is inputted, and a calculation unit for judging the bandwidth of the input packet as being conformant or non-conformant to the contract on the basis of these items of information, thereby to control the bandwidth at each importance level.

5 Claims, 17 Drawing Sheets

OTHER PUBLICATIONS

Office Action from Japanese Patent Office dated Jan. 6, 2009.
Yusheng Ji, "A Discussion on the Performance of Traffic Shaping Mechanisms", Technical Report of IEICE, SSE96-115 (Nov. 1996), English translation of pp. 26-30.
Office Action from the Japanese Patent Office dated Jun. 30, 2009, in Japanese.
Office Action issued by the Japanese Patent Office on Aug. 16, 2011 in Japanese Patent Application No. 2009-054376 (6 pages), which is a Divisional application of the corresponding Japanese Patent Application No. 2003-403972.
Office Action issued by the Japanese Patent Office on Mar. 8, 2011 in Japanese Patent Application No. 2009-054376 (4 pages), which is a Divisional application of the corresponding Japanese Patent Application No. 2003-403972.

* cited by examiner

POLICING DEVICE

CROSS REFERENCE TO RELATED APPLICATIONS

This application is a Continuation Application of U.S. application Ser. No. 11/000,881 filed on Dec. 2, 2004 now U.S. Pat. No. 7,646,711. The present application claims priority from U.S. application Ser. No. 11/000,881 filed on Dec. 2, 2004, which claims priority from Japanese application serial No. 2003-403972, filed on Dec. 3, 2003, the content of which is hereby incorporated by reference into this application.

BACKGROUND OF THE INVENTION

1. Field of the Invention

The present invention relates to a policing device for monitoring the bandwidth of packets flowing into a network.

2. Description of the Related Art

Along with an increase in the users of the Internet, the traffic flowing through the Internet is rapidly expanding. Since packets from many users share the same line on the Internet, the cost per bandwidth is lower than that in networks dedicated to specific groups of users. Because of this low cost, attempts are emerging to realize a reduction in communication cost by integrating telephone networks and enterprise networks through the Internet. The integration requires a bandwidth guarantee similar to what is available on conventional dedicated networks.

A description of the VBR☐2 (Variable Bit Rate☐2) service, which is an example of such bandwidth guarantee, is found in Chapter 4.5 of *The ATM Forum Specification version 4.0* (hereinafter referred to as "Prior Art 1"). To use this service, each user contracts with a service provider for a sustainable cell rate (SCR) and a peak cell rate (PCR). The contracting user sets the cell loss priority (CLP) against discard in the cell header to priority (="0": hardly subject to discard) or non-priority (="1": more subject to discard) and transmits the cell. The policing function at the entrance to the network monitors the average bandwidth of cells whose CLP is "0" and either discards non-conformant cells or rewrites their CLP into "1". It also monitors the maximum bandwidth of cells whose CLP is "0" or "1", and discards non-conformant cells. As a node in the network discards cells of CLP=1 preferentially over cells of CLP=0 when in congestion, this network can guarantee an average bandwidth for cells whose CLP is "0". Although the policing function of ATM is known as Usage Parameter Control (UPC), the terminology in the present application will be unified to "policing function".

The Continuous State Leaky Bucket Algorithm (hereinafter referred as the leaky bucket algorithm) for policing function in ATM is stated in Chapter 4.4.2 of Prior Art 1. The leaky bucket algorithm is represented by a model of a holed bucket, therefore a leaky bucket having a certain capacity. As long as the bucket is holding water, a quantity of water leaks in proportion to the monitored bandwidth, and upon arrival of a cell a quantity of water equivalent to one cell is poured into the bucket. To allow for cell delay variations and bursts, input cells are judged as conformant until water overflows the bucket having a predetermined capacity, and when the bucket is overflowed, input cells are regarded as non-conformant.

A flow chart of the leaky bucket algorithm is shown in FIG. 17. When a cell arrives at time "ta" (step 1701), the time difference from the arrival time LCT of a cell judged as conformant last time (corresponding to the quantity of water leaking from the bucket) is calculated. The balance X' of subtracting this value from a value of a counter X corresponding to the stored water quantity in the bucket is calculated (step 1702). If the balance X' is negative, X' will be corrected to "0" (step 1704). X' is compared with a limit L corresponding to the capacity of the bucket (step 1705). If X'≧L holds, the input cell will be judged as non-conformant (step 1706). If X'<L holds, it will be judged as conformant, and a value resulting from the addition to X' of a fixed value I corresponding to the quantity of water equivalent to one cell determined by the monitored bandwidth will be stored as a new value of X (step 1707). Incidentally, upon arrival of the first cell, X=0, LCT is initialized to the time of arrival of that cell.

A problem is known in the VBR.2 service of Prior Art 1 that the average bandwidth cannot be effectively utilized. The policing function according to Prior Art 1 subjects cells of CLP=0 to bandwidth monitoring, and transmits cells judged to be within the average bandwidth with their CLP being kept at 0. Even if the bandwidth of cell whose CLP is 0 drops below the average bandwidth, the policing function does not transmit any cell of CLP=1 as a cell of CLP=0. That is, the contracting user cannot use up all of the average bandwidth when cells of CLP=0 flow within the average bandwidth.

FIG. 16A shows an example of bandwidth variation of cells of CLP=0 and CLP=1 transmitted by the contracting user, wherein the shaded part represents CLP=0 and the blank part, CLP=1. FIG. 16B shows the bandwidth variation of each cell after passing through the policing function, wherein the hatched part represents CLP=0. Even though the cells of CLP=0 are within the average bandwidth at time period t0, the cell of CLP=1 is transmitted intact with CLP=1.

A policing function to solve this problem is proposed in the Japanese Laid-Open Patent No. 2000-349812 (hereinafter referred to as Prior Art 2). According to Prior Art 2, the contracting user and the service provider agree on a contract bandwidth, and the contracting user notifies the service provider of the method to distinguish important packets from other unimportant packets. The policing function of Prior Art 2 carries out bandwidth monitoring taking account of the relative importance of each received packet, and judges those packets found conformant to be priority packets and others to be non-priority packets. In this decision, if the bandwidth of the important packets is less than the contract bandwidth, unimportant packets will also be judged as priority packets. Therefore, when the total bandwidth of packets transmitted by the contracting user exceeds the contract bandwidth, the contracting user can exhaustively use the whole contract bandwidth.

Prior Art 2 further discloses a method to extend the leaky bucket algorithm so as to realize the bandwidth monitoring discussed above. The policing function according to Prior Art 2 uses an expanded leaky bucket algorithm applicable to variable-length packets. The algorithm uses a limit L-A for priority packets and a limit L-B for non-priority packets, and enables to treat unimportant packets also as priority packets when important packets are less than the monitored bandwidth, by setting L-A greater than L-B.

Prior Art 2 describes a fully prioritized allocation according to which the contract bandwidth promised to each contracting user is allocated to priority packets preferentially and, only when there is a surplus in the contract bandwidth, the bandwidth is also allocated to non-priority packets as well. According to Prior Art 2, if the bandwidth of important packets exceeds the contract bandwidth, none of unimportant packets will be judged as deserving priority. However, some of contracting users need to secure a minimum bandwidth for unimportant packets. For this reason, the policing device is required to flexibly allocate the contract bandwidth between important packets and unimportant packets.

So far, a case where one contracting user has a plurality of levels of importance has been considered, but there may be a case where one contracting user has a plurality of organizational units, such as departments for research and development, production, sales and so forth if the user is a business enterprise. In such a case, a bandwidth should be guaranteed not only for each contracting user but also for each department of the user. As the policing function according to Prior Art 2 allocates the contract bandwidth promised to each contracting user among its different departments in a fully prioritized way, some department may find no priority packet at its disposal. Nor does Prior Art 1 give any mention of a method to solve this problem.

SUMMARY OF THE INVENTION

An object of the invention is to solve the problems noted above by providing a policing function capable of flexible allocation of a contract bandwidth promised to each contracting user among packets having different levels of importance or among packets from different departments of the contracting user.

In order to solve the problems, a policing device according to the invention is provided with a flow detection unit for detecting, based on least one information item of the header information of an input packet, a flow to which the packet belongs and the level of priority or a department within the flow, and determining a flow identifier of the flow and an identifier of the relative importance or the department. The policing device according to the invention is further provided with a bandwidth monitoring table including for each flow identifier an entry which includes monitored bandwidth information indicating the bandwidth for monitoring packets belonging to the flow, the allocation weight for each level of importance or for each department, and packet arrival history information indicating the arrival history of packets. At the time a packet is inputted, a policing result decision unit judges whether the packet is conformant or non-conformant to the contract by referring to the information in the entry corresponding to the flow identifier of the packet.

Since the policing device according to the invention allows bandwidth monitoring based on a packet arrival history for each level of importance or for each department and an allocated bandwidth for each level of importance or for each department obtained from monitored bandwidth information and the allocation weight, it is able to control the bandwidth for each level of importance or for each department. For instance, in the case where the packet arrival history information represents the number of bytes of each level of importance or each department received during the last one second, it will be required only to compare the number of bytes with the allocated bandwidth for each level of importance or for each department. On the other hand, the policing device according to Prior Art 2 cannot control the bandwidth for each level of importance or for each department because it can be provided with only one counter value X per flow corresponding to the packet arrival history information.

Another policing device according to the invention is provided with a flow detection unit for detecting, based on at least one information item of the header information of the input packet, the flow to which the packet belongs and the level of importance or department within the flow, and determining a flow identifier which is the identifier of the detected flow and an identifier which is the identifier of the level of importance or the department.

The policing device is further provided with a bandwidth monitoring table including, for each flow identifier and for each level of importance or department, an entry including monitored bandwidth information of the flow, allocation weight of one level of importance or one department within the flow, and packet arrival history information. At the time a packet is inputted, a policing result decision unit judges whether the packet is conformant or non-conformant based on the information in the all entries corresponding to the flow identifier of the packet.

Other problems the invention is intended to solve than those stated above and solutions thereto will become apparent from the following description of the preferred embodiments thereof when taken in conjunction with accompanying drawings.

DETAILED DESCRIPTION OF THE EMBODIMENTS

Figure 2:
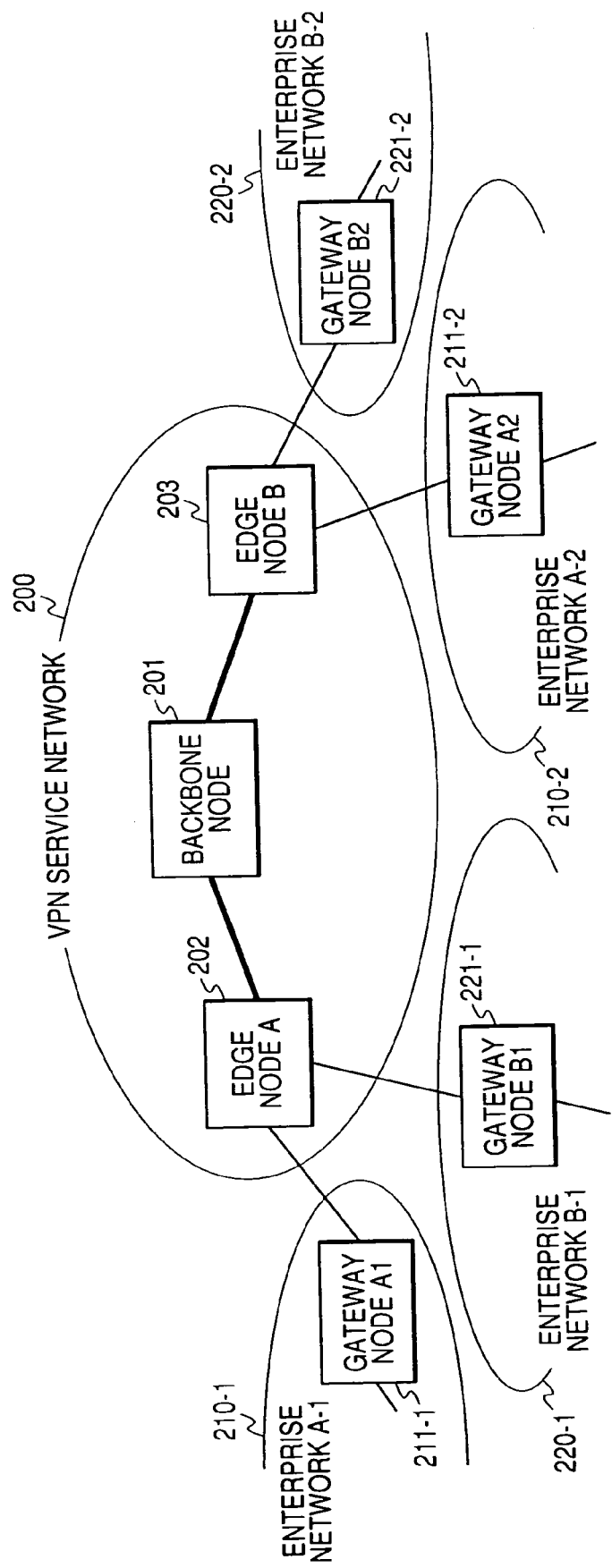
FIG. 2 shows a network configuration assumed for the invention.

First, a network configuration assumed for the present invention will be described with reference to FIG. 2. In the network shown in FIG. 2, an enterprise network A-1: 210-1 and an enterprise network A-2: 210-2 of Enterprise A are connected by a VPN (virtual private network) service network 200 provided by a carrier. Similarly, an enterprise network B-1: 220-1 and an enterprise network B-2: 220-2 of Enterprise B, a different organization from Enterprise A, are connected. The VPN service network 200 is configured of an edge node A: 202, an edge node B: 203, both located on one edge or another, and a backbone node 201 located at the core. At the entrances or exits of the enterprise networks, a gateway node A1: 211-1, a gateway node A2: 211-2, a gateway node B1: 221-1 and a gateway node B2: 221-2 are located.

Between the carrier offering the service of connection to the enterprise site and the administrator of the enterprise networks A-1/A-2, a bandwidth for packets to be transferred from the enterprise network A-1 to the enterprise network A-2 (hereinafter referred to as the contract bandwidth) is contracted. The edge node A: 202 measures the bandwidths of packets received from the gateway node A1: 211-1, and transmits to the backbone node 201 packets within the contract bandwidth as priority packets and packets judged as exceeding the contract bandwidth as non-priority packets. As the backbone node 201 and the edge node B: 203 each transfers priority packet to the enterprise network A-2: 210-2 preferentially, the VPN service network 200 can guarantee the contract bandwidth between the enterprise networks A-1 and A-2.

The administrator of the enterprise networks A-1/A-2 declares to the carrier in advance the condition of distinguishing packets important to Enterprise A (hereinafter referred to as important packets) and other packets (hereinafter referred to as unimportant packets). The edge node A: 202 detects the importance of each of input packets according to the declared condition, and performs bandwidth monitoring based on the importance. It is supposed that, in this embodiment of the invention, the administrator of the enterprise networks A has declared that packets transmitted from a terminal having a specific IP address in the enterprise network A-1: 210-1 to be important packets and other packets to be unimportant packets.

Figure 3:
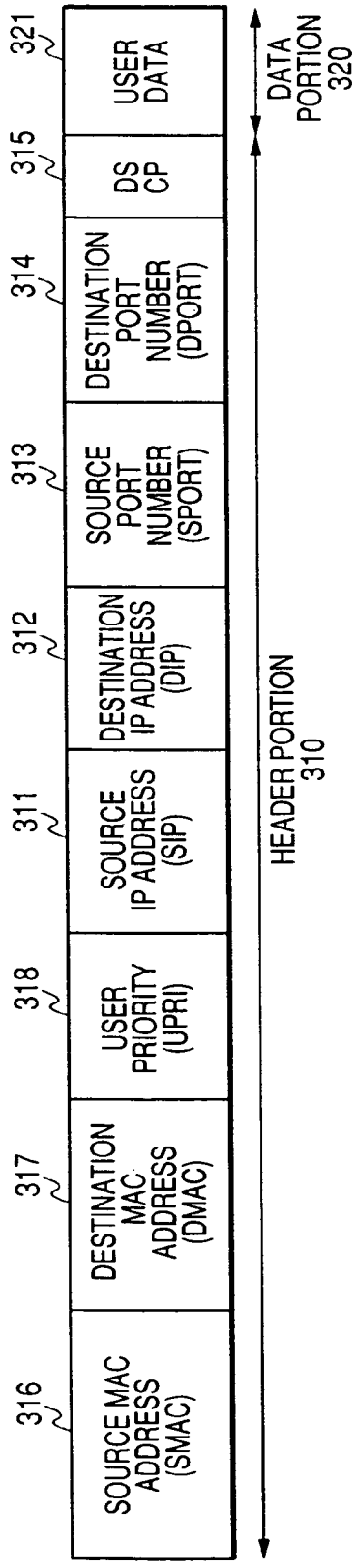
FIG. 3 shows a format of a packet in a VPN service network.
Figure 4:
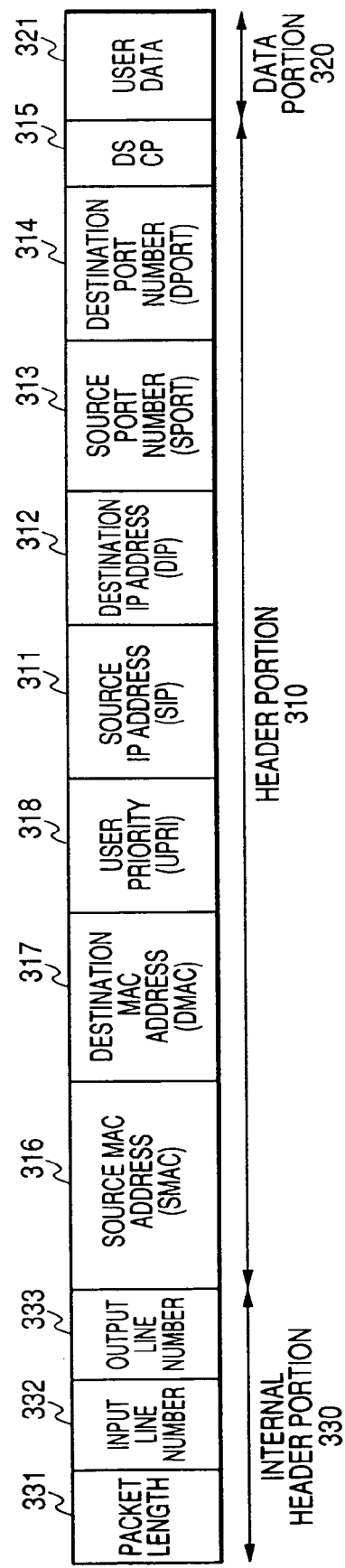
FIG. 4 shows a format of a packet in a node according to the invention.
Figure 5:
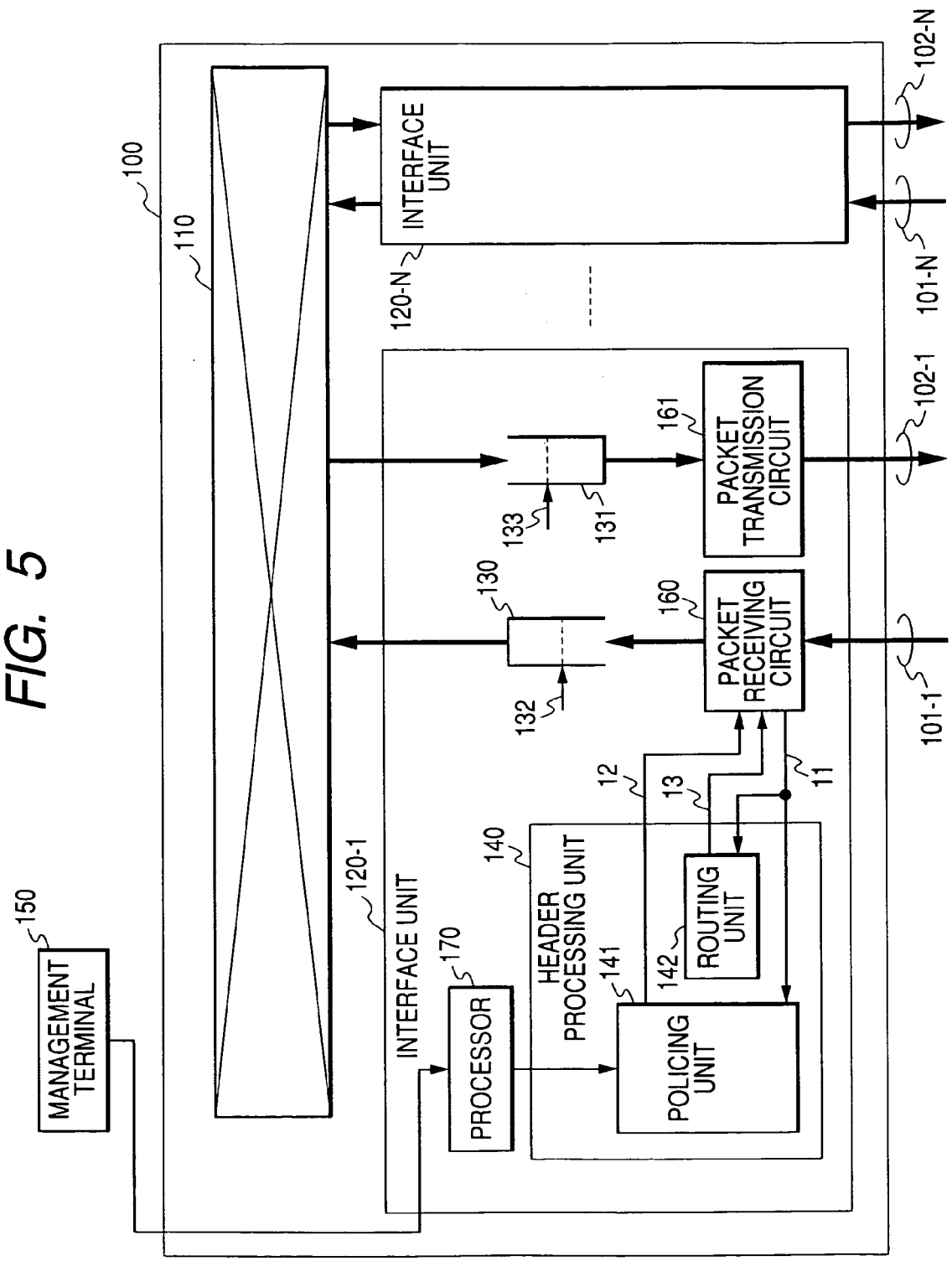
FIG. 5 is a block diagram showing the configuration of the node according to the invention.

The operations of nodes having the policing function according to the present invention will be summarized with reference to FIG. 3 through FIG. 5.

FIG. 5 shows a node device 100 according to the invention. In this embodiment, the node device 100 according to the invention is supposed to be used as the edge node A: 202 of the VPN service network 200 and is monitoring the bandwidths of packets transmitted by the enterprise network A-1: 210-1.

The node device 100 has N each of input lines 101-$i$ ($i$=1 to N), output lines 102-$i$ and interface units 120-$i$, and a packet transfer unit 110 which connects these interface units 120-$i$.

Each of the interface units 120 is comprised of a packet receiving circuit 160 for processing received packets, a header processing unit 140 for performing bandwidth monitoring, determining the transfer priority within the VPN service network 200, and searching a routing table to determine the ID number (output line number) of the line to which the packet is transmitted, a reception side buffer 130 for storing received packets, a transmission side buffer 131 for storing packets received from the packet transfer unit 110, and a packet transmission circuit 161 for reading out a packet from the transmission side buffer 131 to perform transmission process of the packet.

FIG. 3 shows an example of packet format in the enterprise network A and the VPN service network 200. The packet is composed of a header portion 310 and a data portion 320. The header portion 310 is comprised of a source IP address (hereinafter referred to as "SIP") 311 which is the address of the transmission source (the transmission terminal address) on the network layer; a destination IP address (hereinafter referred to as "DIP") 312 which is the address of the destination (the reception terminal address); a source port (hereinafter referred to as "SPORT") 313 and a destination port (hereinafter referred to as "DPORT") 314, both representing a protocol (a higher layer application); a diffserv code point (DSCP) 315 representing the transfer priority on the network layer; a source MAC address (hereinafter referred to as "SMAC") 316 which is the address of the transmission source on the data link layer; a destination MAC address (hereinafter referred to as "DMAC") 317 which is the address of the destination on the data link layer; and a user priority (hereinafter referred to as "UPRI") 318 representing the transfer priority on the data link layer. The data portion 320 includes user data 321.

FIG. 4 shows an example of packet format in the node device 100 according to the invention. This format includes an internal header 330 in addition to the above-described format. The internal header 330 is comprised of a packet length 331 representing the byte length of the packet, an input line number 332, which is the ID number of an input line from which the packet has been inputted, and an output line number 333, which is the ID number of an output line to which the packet is to be outputted.

When a packet is inputted from an input line 101, the packet receiving circuit 160 adds the internal header 330 to the packet, counts the byte length of the packet to write it into the packet length 331, and writes into the input line number 332 the input line number of the input line 101 from which the packet has been inputted. At the same time as the packet is once stored, the packet receiving circuit 160 transmits information in the internal header 330 and the header portion 310, except the output line number 333, to the header processing unit 140 as packet header information 11.

The policing unit 141 of the header processing unit 140 performs bandwidth monitoring to determine the DSCP, which is the transfer priority within the network, and the user priority, and transmits them to the packet receiving circuit 160 as packet priority information 12. The routing unit 142 of the header processing unit 140 determines the output line number from the information corresponding to the DIP 312 or the DMAC 317 in the packet header information 11, and transmits it to the packet receiving circuit 160 as packet output line information 13. In the case where the node device 100 is a router, the DIP 312 will be used to determine the output line number. If the node device is a switch, the DMAC 317 will be used.

The packet receiving circuit 160 writes the DSCP and the user priority in the packet priority information 12 into the DSCP 315 and the UPRI 318 of the stored packet, writes the output line number in the packet output line information 13 into the output line number 333, and transmits the stored packet to the reception side buffer 130.

The reception side buffer 130 is provided with a discard threshold 132, and executes buffer storage control based on the value of the DSCP 315 or the UPRI 318. In the buffer storage control, when the DSCP 315 or the UPRI 318 to be used as the transfer priority represents a priority packet, the reception side buffer 130 stores the received packet if there is any vacancy in the reception side buffer 130. Otherwise, the received packet will be discarded. On the other hand, in the case where the DSCP 315 or the UPRI 318 represents a non-priority packet, the received packet will be stored only when the quantity of stored packets is equal to or below the discard threshold 132. If packets have been already stored beyond the discard threshold 132, the received packet will be discarded even if there is any vacancy in the reception side buffer 130. According to the above buffer storage control, the node device 100 can guarantee the quality of service for priority packets.

The packet transfer unit 110 reads out a packet in the reception side buffer 130, and transfers the packet to one of the interface units 120 corresponding to the output line number 333. The transmission side buffer 131 having received the packet performs buffer storage control similar to that performed by the reception side buffer 130. The packet transmission circuit 161 reads out the packet from the reception side buffer 130, deletes the internal header 330, and transmits the resultant packet to an output line 102.

Next, the operations of the policing unit 141 according to the invention will be described in more detail with reference to FIG. 1, FIG. 6, FIG. 7 and FIG. 8. The policing unit 141 according to the invention uses, as its bandwidth monitoring algorithm, an algorithm resulting from expansion of the leaky bucket algorithm to adapt to the bandwidth monitoring of variable-length packets.

Figure 1:
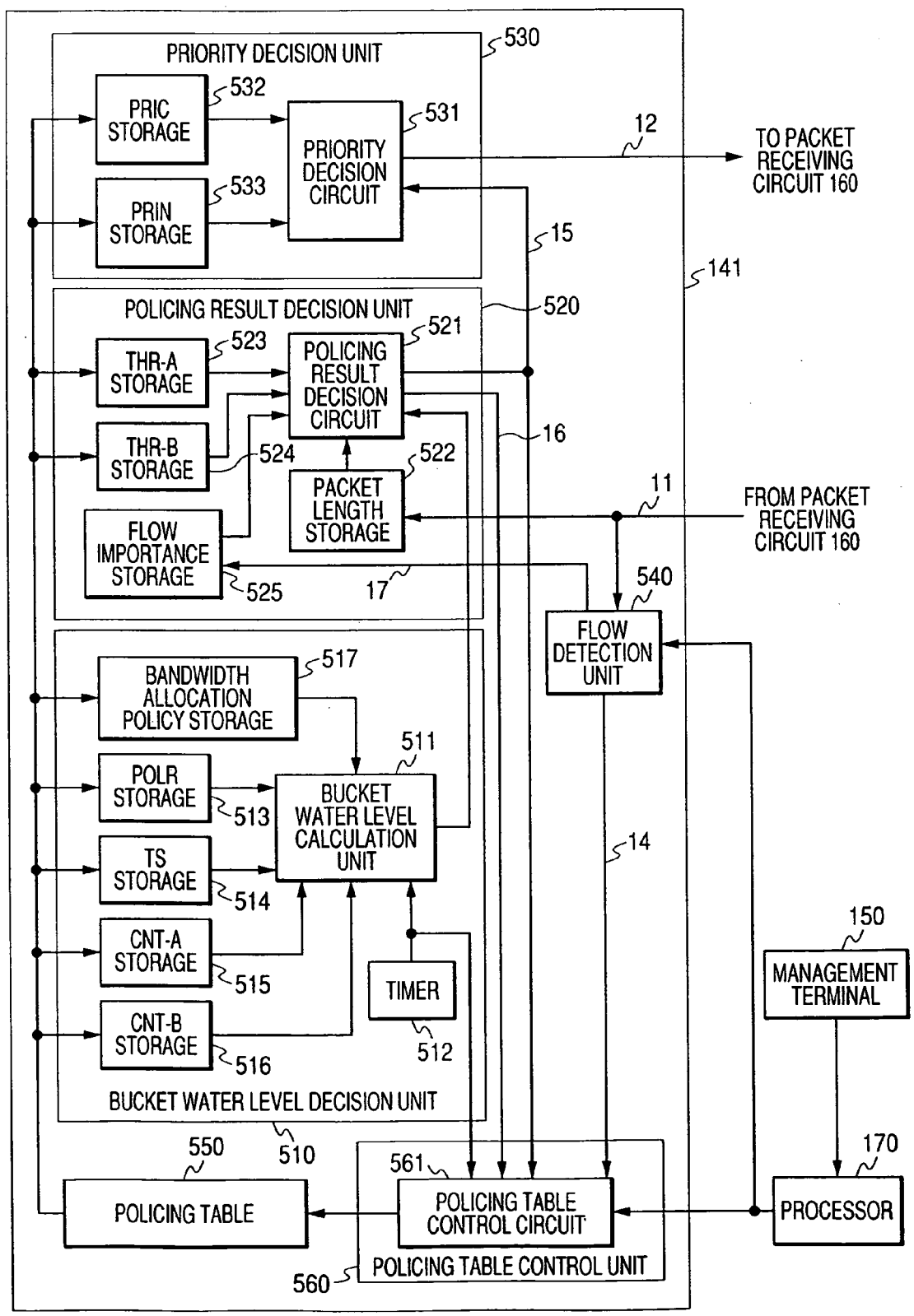
FIG. 1 is a block diagram showing the configuration of a policing unit 141 according to the present invention.

FIG. 1 shows a block diagram of the policing unit 141. The policing unit 141 is comprised of a bucket water level decision unit 510, a policing result decision unit 520, a priority decision unit 530, a flow detection unit 540, a policing table 550 and a policing table control unit 560.

The flow detection unit 540 is an intrinsic functional unit of a router or a switch. In the ATM network, connections are set up in advance, and each of ATM switches in the ATM network reads out policing control information corresponding to the connection identifier of an input cell, and executes bandwidth monitoring by using that information (connection type communication). On the other hand, no connection is set up in advance in an IP network, typically the Internet. For this reason a router or a switch located in the IP network needs a flow detecting means to determine a flow identifier in place of the connection identifier for each input packet (connectionless type communication). The router reads out policing control information corresponding to the flow identifier, and executes bandwidth monitoring by using the policing control information. In the present application, a series of packets each having the same information with respect to specific items in the header is referred to as a "flow".

Figure 6:
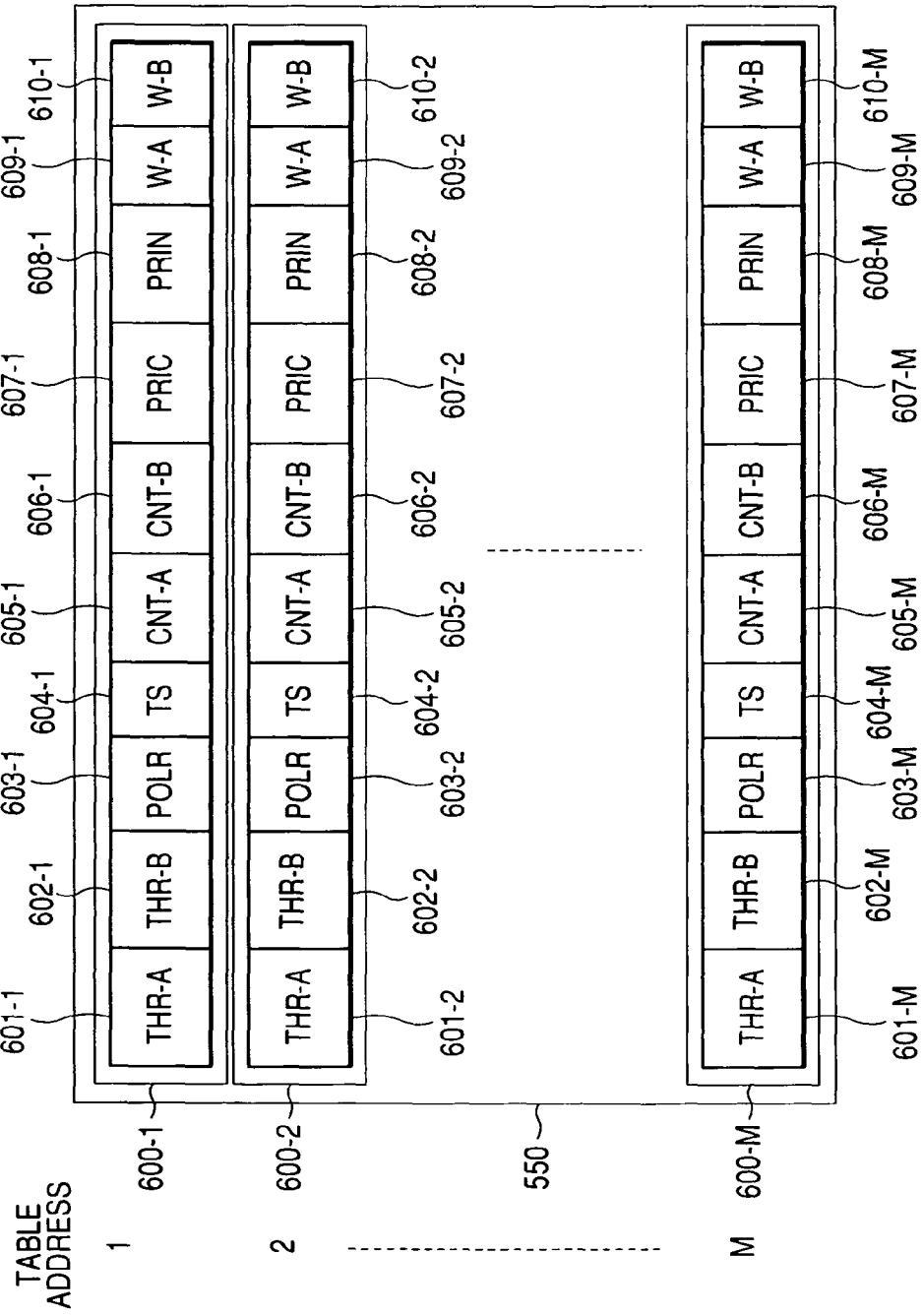
FIG. 6 shows a format of a packet in a policing table 550.

FIG. 6 shows a format of the policing table 550.

The policing table 550 holds M policing control information entries 600-j (j=1 to M). The policing unit 141 performs bandwidth monitoring of each flow according to each of the policing control information entries 600-j. In this embodiment, description will be made in the case where all the packets delivered from the enterprise network A-1: 210-1 to the VPN service network 200 are monitored, with the contract bandwidth, according to one policing control information entry 600-j.

The policing control information entry 600-j includes a bucket capacity THR-A (Threshold-A) 601-j (bytes) for important packets; THR-B (Threshold-B) 602-j (bytes) for unimportant packets; POLR (policing rate) 603-j (bytes/sec), which is the speed of leaking from the bucket and represents the monitoring bandwidth; TS (Time Stamp) 604-j (sec) representing the arrival time of a preceding packet referencing the same policing control information entry 600-j; CNT-A (Count-A) 605-j (bytes) and CNT-B (Count-B) 606-j (bytes), which respectively indicate the water level of important packets and that of unimportant packets stored in the bucket immediately after the bandwidth monitoring of the preceding packet; PRIC (Priority Conformance) 607-j representing the level of priority of a packet to be judged by bandwidth monitoring as "conformant" and transferred as a priority packet; PRIN (Priority non-Conformance) 608-j representing the level of priority of a packet to be judged as "non-conformant" and transferred as a non-priority packet; and W-A (height-A): 609-j and W-B (height-B) 610-j representing the allocation weights of the contract bandwidth between important packets and unimportant packets. As priority levels in PRIC: 607-j and PRIN: 608-j, DSCP and user priority are stated here.

In Prior Art 2, since it needs only one bucket, only one water level CNT is required. However, the policing unit 141 according to the invention has separate buckets for important packets and unimportant packets, there is provided for each packet with two each of water levels CNT-A: 605-j and CNT-B: 606-j and bucket capacities THR-A: 601-j and THR-B: 602-j.

Figure 7:
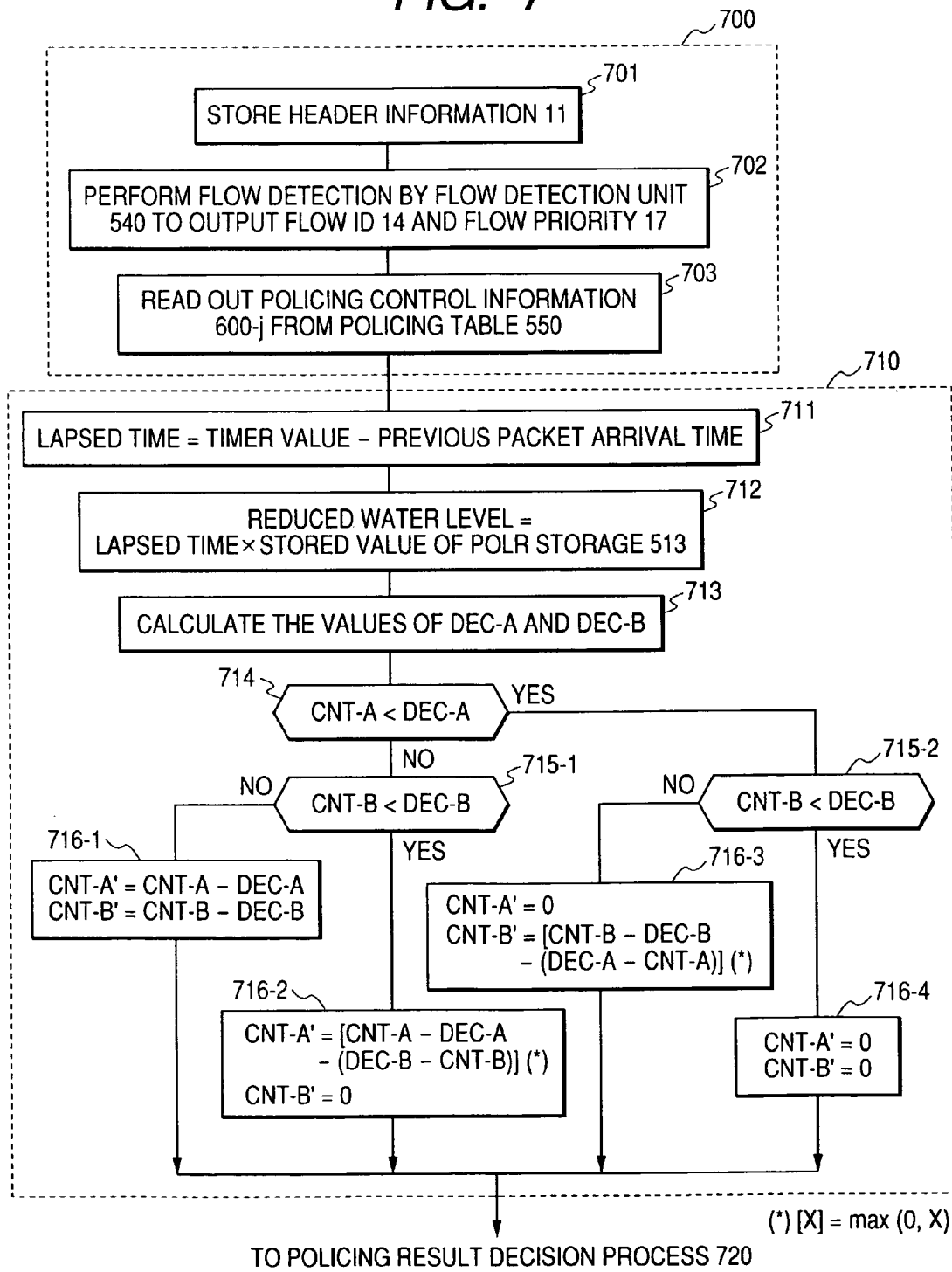
FIG. 7 is the former half of a flow chart of the policing unit 141 to which the invention is applied.
Figure 8:
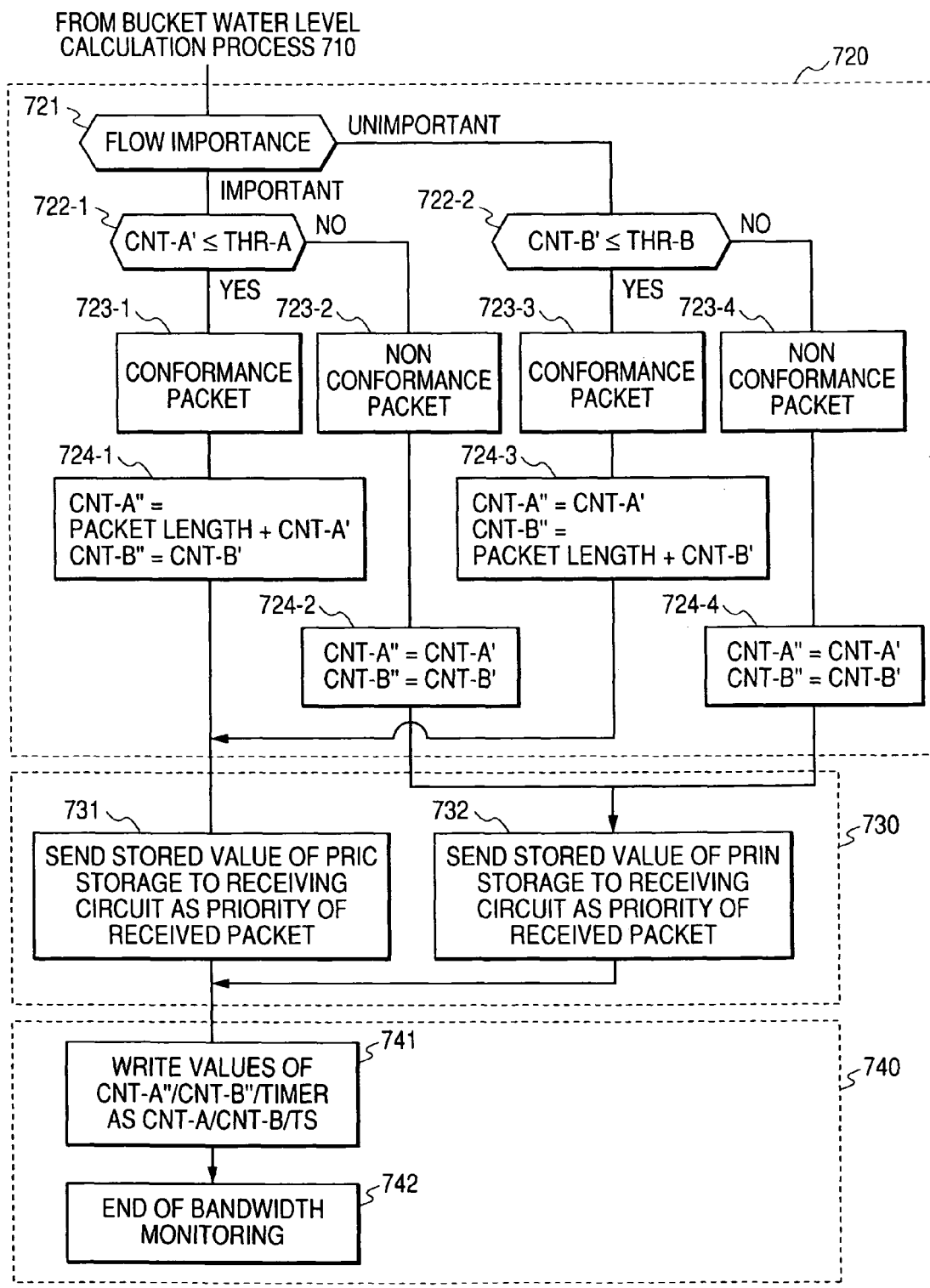
FIG. 8 is the latter half of the flowchart of the policing unit 141 to which the invention is applied.

FIG. 7 shows the former half of a flow chart of the policing unit 141, and FIG. 8, the latter half of the same.

Processing by the policing unit 141 is comprised of a policing start process 700, a bucket water level calculation process 710, a policing result decision process 720, a priority level decision process 730 and a policing end process 740. The three processes 710, 720 and 730 are mainly executed by the bucket water level decision unit 510, the policing result decision unit 520 and the priority decision unit 530, respectively.

When the policing unit 141 receives the packet header information 11, information corresponding to the packet length 331 is stored in the packet length storage 522 of the policing result decision unit 520. Information corresponding to the SIP 311, the DIP 312, the SPORT 313, the DPORT 314, the DSCP 315, the SMAC 316, the DMAC 317, the UPRI 318 and the input line number 332 is stored in the flow detection unit 540 (step 701). At step 702, the flow detection unit 540 detects the flow based on the stored information, determines a contracting user identifier which is the identifier of the contracting user having transmitted the input packet and a flow importance level which is the importance level of the input packet, and transmits contracting user information 14 including of the contracting user identifier to a policing table control circuit 561 of the policing table control unit 560 and flow importance level information 17 including of the flow importance level to the flow importance level storage 525 of the policing result decision unit 520.

Regarding the contracting user (Enterprise A in this embodiment), for instance, the flow detection unit 540 may identify the contracting user according to the input line number 332, which is the reference number of the line to which the received packet was inputted. If each enterprise has declared to the administrator of the VPN service network 200 the IP addresses of the terminals belonging to that enterprise, the contracting user can be identified by that IP address. Regarding the identification of the importance level, in the case of this embodiment where the administrator of each enterprise is supposed to have declared packets to be transmitted from a terminal of a specific IP address as important packets and other packets as unimportant packets, the flow detection unit 540 judges the importance level from information corresponding to the SIP 311.

The policing table control circuit 561 prepares the address of the policing table 550 from the contracting user information 14, and reads out the policing control information 600-j. The read-out values of THR-A: 601-j and THR-B: 602-j are stored in a THR-A storage 523 and a THR-B storage 524 of the policing result decision unit 520, respectively. The read out values of POLR: 603-j, TS: 604-j, CNT-A: 605-j and CNT-B: 606-j are stored in a POLR storage 513, a TS storage 514, a CNT-A storage 515C and an CNT-B storage 516 of the bucket water level decision unit 510, respectively. The read out values of W-A: 609-$j$ and W-B: 610-$j$ are stored in a bandwidth allocation policy storage 517. The read out values of DSCP and user priority level in PRIC: 607-$j$ and PRIN: 608-$j$ at the time of conformance or non-conformance are stored in a PRIC storage 532 and a PRIN storage 533 of the priority decision unit 530 (step 703).

In the bucket water level calculation process 710, the bucket water level decision unit 510 determines the bucket water level (the quantity of water stored in the bucket) immediately before the packet inputting. First, a bucket water level calculation unit 511 calculates the difference between the reading of a timer 512 indicating the current time and the arrival time of the preceding packet stored in the TS storage 514 to figure out the lapsed time passed since the arrival of the preceding packet (step 711). Then, by multiplying the lapsed time by a value stored in the POLR storage 513, the quantity of water having leaked since the arrival of the preceding packet (water quantity decrement) is figured out (step 712).

The bucket water level calculation unit 511 determines the quantity of water to be subtracted from CNT-A and CNT-B based on the allocation weights of the contract bandwidth stored in the bandwidth allocation policy storage 517. At step 712, tentative reduced water quantities DEC-A and DEC-B are figured out based on the allocation weights W-A and W-B (step 713). The quantities are stated to be "tentative" here because, if the values of CNT-A and CNT-B are smaller than DEC-A and DEC-B, respectively, DEC-A and DEC-B will not prove to be actual water quantity decrements. At the following steps 714 through 716, values CNT-A' and CNT-B' after the subtraction of the decrements from CNT-A and CNT-B are calculated based on the relative magnitudes of CNT-A, CNT-B, DEC-A and DEC-B. First at step 714 and step 715, these relative magnitudes are determined, and branching into step 716-1 through 716-4 takes place based on the result of determination. Step 716-1 is a case of CNT-A≧DEC-A and CNT-B≧DEC-B.

It is supposed here that the new values of CNT-A and CNT-B, i.e. CNT-A' and CNT-B' respectively, are CNT-A–DEC-A and CNT-B–DEC-B. Step 716-2 is a case of CNT-A≧DEC-A and CNT-B<DEC-B. Since the balance of subtracting DEC-B from CNT-B is a negative value, CNT-B' is supposed to be "0". The water quantity equivalent to DEC-B–CNT-B, which could not be subtracted from CNT-B then, can be subtracted from CNT-A. Therefore as the value of CNT-A', either (CNT-A–DEC-A)–(DEC-B–CNT-B) or "0", whichever is the greater, is selected. Similarly at step 716-3, CNT-A' is supposed to be "0", and either (CNT-B–DEC-B)–(DEC-A–CNT-A) or "0", whichever is the greater, is selected as the value of CNT-B. Step 716-4 is a case of CNT-A<DEC-A and CNT-B<DEC-B. Both CNT-A' and CNT-B' are supposed to be "0". While cases of positive W-B have been considered so far, supposing W-B to be "0", the contract bandwidth can be allocated to important packets in a fully prioritized way. This allocation of water quantity decrements based on W-A and W-B is a unique feature of processing according to the invention.

The policing result decision process 720 decides with the policing result decision circuit 52 of the policing result decision unit 520 whether or not the water level determined by the bucket water level decision unit 510 can be kept within the bucket threshold corresponding to the importance level of the input packet. First, the flow importance level information 17 transmitted from the flow detection unit 540 is stored in the flow importance level storage 525. Based on the stored information, the search processing is branched (step 721). If the stored information indicates "importance", the relative magnitudes of the bucket capacities THR-A and CNT-A' for important packets stored in the THR-A storage 523 are compared (step 722-1).

If CNT-A'≦THR-A holds and the bucket is not overflowed, the input packet will be judged as a conformant packet, and policing result information 15 indicating "conformance" will be transmitted to a priority decision circuit 531 and the policing table control circuit 561 (step 723-1). Further, the values of CNT-A'+packet length in the packet length storage and CNT-B' are respectively set in the water quantities CNT-A" and CNT-B" for important and unimportant packets to be used upon arrival of the next packet, and transmitted to the policing table control circuit 561 as bucket water level information 16 (step 724-1).

If CNT-A'>THR-A holds and the bucket is overflowed, the input packet will be judged as a non-conformant packet, and policing result information 15 indicating "non-conformance" will be transmitted to the priority decision circuit 531 and the policing table control circuit 561 (step 723-2). Further, the values of CNT-A' and CNT-B' are respectively set in CNT-A" and CNT-B", and transmitted to the policing table control circuit 561 as bucket water level information 16 (step 724-2).

On the other hand, if the result of referencing at step 721 indicates unimportance, the relative magnitudes THR-B and CNT-B' of bucket capacities for unimportant packets stored in the THR-B storage 524 will be compared (step 722-2). If CNT-B'≦THR-B holds, the input packet will be judged as a conformant packet, and policing result information 15 indicating "conformance" will be transmitted to the priority decision circuit 531 and the policing table control circuit 561 (step 723-3). Further, the values of CNT-A' and CNT-B' □ packet length in the packet length storage 522 are respectively set in CNT-A" and CNT-B", and transmitted to the policing table control circuit 561 as bucket water level information 16 (step 724-3).

If CNT-B'>THR-B holds and the bucket is overflowed, the input packet will be judged as a non-conformant packet, and policing result information 15 indicating "non-conformance" will be transmitted to the priority decision circuit 531 and the policing table control circuit 561 (step 724-3). Further, the values of CNT-A' and CNT-B' are set in CNT-A" and CNT-B", and transmitted to the policing table control circuit 561 as bucket water level information 16 (step 724-4).

In the priority level decision process 730, the priority decision unit 530 determines the priority level based on policing result information 15. When the policing result information 15 indicates "conformance", the priority decision circuit 531 judges the DSCP and the user priority in the PRIC storage 532 to be the DSCP and the user priority of the input packet, and transmits packet priority information 12 including the priority level to the packet receiving circuit 160 (step 731). If the policing result information 15 indicates "non-conformance", the DSCP and the user priority in the PRIN storage 533 will be judged as the DSCP and the user priority of the input packet, and packet priority information 12 including the decision information will be transmitted to the packet receiving circuit 160 (step 732).

In the policing end process 740, the policing table control circuit 561 writes the values of CNT-A" and CNT-B" in the bucket water level information 16 and the count of the timer 512 respectively into the CNT-A: 605-$j$, CNT-B: 606-$j$ and TS: 604-$j$ in the policing control information 600-$j$ corresponding to the contracting user information 14 (step 741) to end the bandwidth monitoring (step 742).

By using an external management terminal 150 of the node device 100, the administrator of the VPN service network 200 sets up information regarding bandwidth monitoring to the node device 100.

Figure 18:
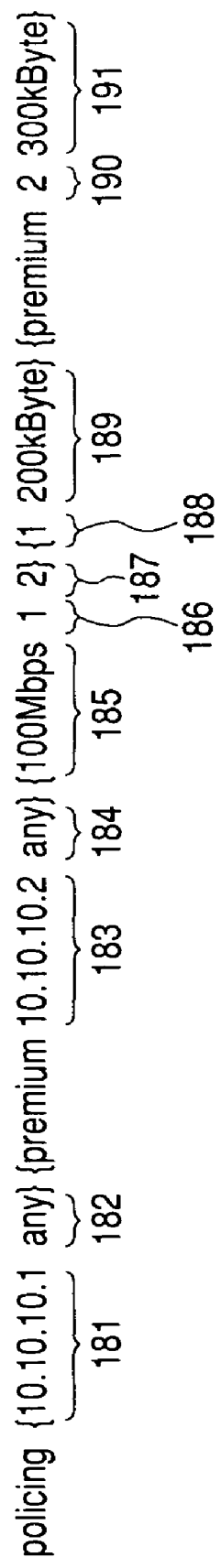
FIG. 18 shows an example of command entered by a management terminal 150.

One example of a command inputted to the management terminal 150 is shown in FIG. 18. SIP and DIP of unimportant packets are set in fields 181 and 182 of this command, while SIP and DIP of important packets are set in fields 183 and 184. In fields 185, 186 and 187, the monitored bandwidth and the priority levels of priority and non-priority packets are set. In fields 188 and 189, the allocation weight W of unimportant packets and the capacity THR of the bucket are set, while in fields 190 and 191, the allocation weight W of important packets and the capacity THR of the bucket are set.

The command shown in FIG. 18 is a command to monitor at 100 Mbps the bandwidth of packets transmitted from transmission terminals having source IP addresses "10.10.10.1" and "10.10.10.2", and to perform bandwidth monitoring to determine the priority levels of priority packets and non-priority packets (DSCP or user priority) to be "1" and "2", respectively. This command further indicates that unimportant packets transmitted from the transmission terminal having the source IP address "10.10.10.1" are monitored with a 200K byte bucket and important packets transmitted from the transmission terminal having the IP address "10.10.10.2" are monitored with a 300K byte bucket. The allocation weights W of priority packets and non-priority packets are respectively "2" and "1".

A processor 170 having received the above-described command sets the information indicated by the fields 181 through 184 to the flow detection unit 540, and the information indicated by the fields 185 through 191 to POLR: 603, PRIC: 607, PRI N: 608, W-B: 610, THR-B: 602, W-A: 609 and THR-A: 601 of the entry 600, respectively. Incidentally, TS: 604, CNT-A: 605 and CNT-B: 606 are initialized to "0".

Next, the effects of the node device 100 according to the invention will be described with reference to FIG. 15.

Figure 15A:
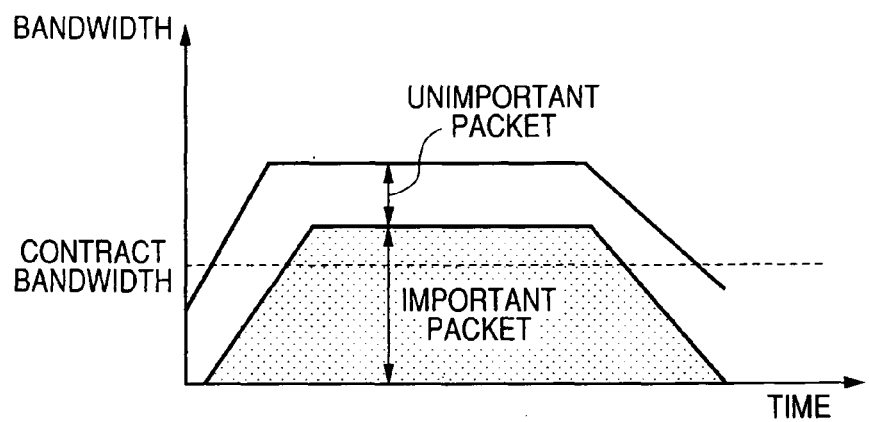
FIG. 15A shows bandwidth variations over time of important packets and unimportant packets transmitted by an enterprise network A210-1.

FIG. 15A shows one example of the bandwidth variation over time of packets inputted to the node device 100, wherein the shaded part represents the bandwidth of important packets and the blank part represents the bandwidth of unimportant packets.

Figure 15B:
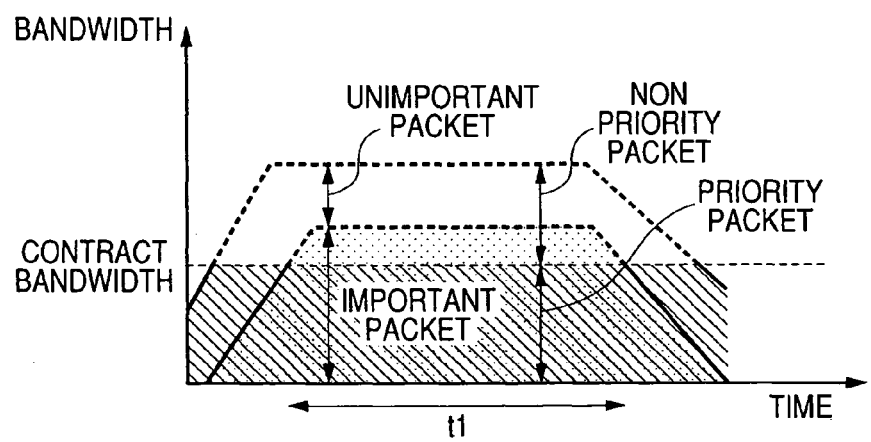
FIG. 15B shows bandwidth variations over time of priority packets and non-priority packets where Prior Art 2 is applied.

FIG. 15B shows the bandwidth variation over time of priority packets and non-priority packets when the traffic shown in FIG. 15A is monitored by using the policing function according to Prior Art 2. The hatched part represents priority packets and the remaining non-hatched part represents non-priority packets. According to Prior Art 2, since important packets are judged as packets within the contract bandwidth preferentially, there exists a problem that unimportant packets are always treated as non-priority packets in period t1.

Figure 15C:
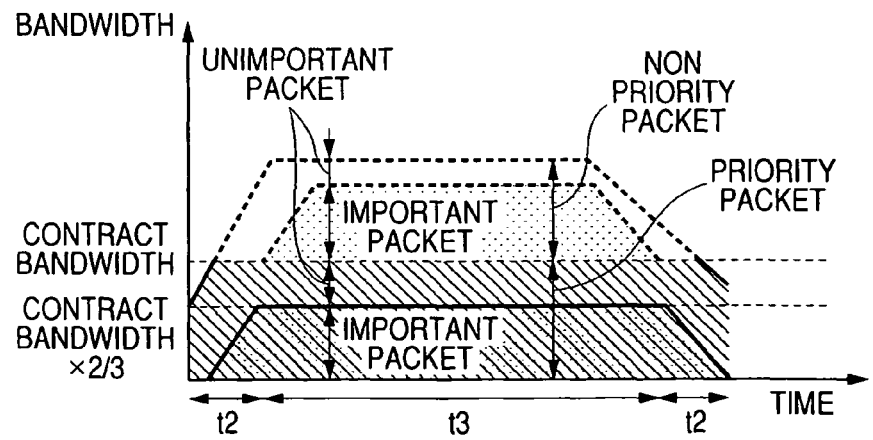
FIG. 15C shows bandwidth variations over time of priority packets and non-priority packets where the invention is applied.
Figure 16A:
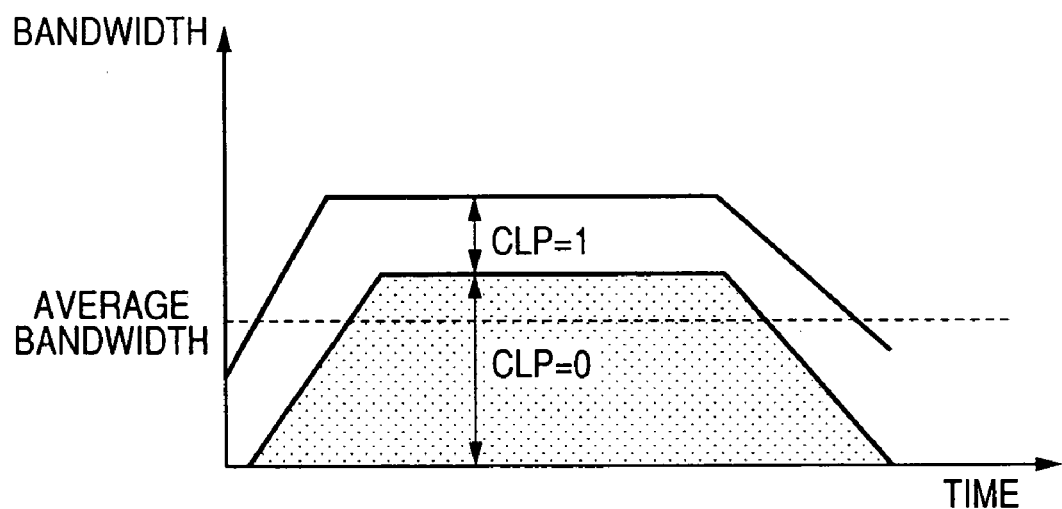
FIG. 16A shows bandwidth variations over time of cells of CLP=0 and of CLP=1.
Figure 16B:
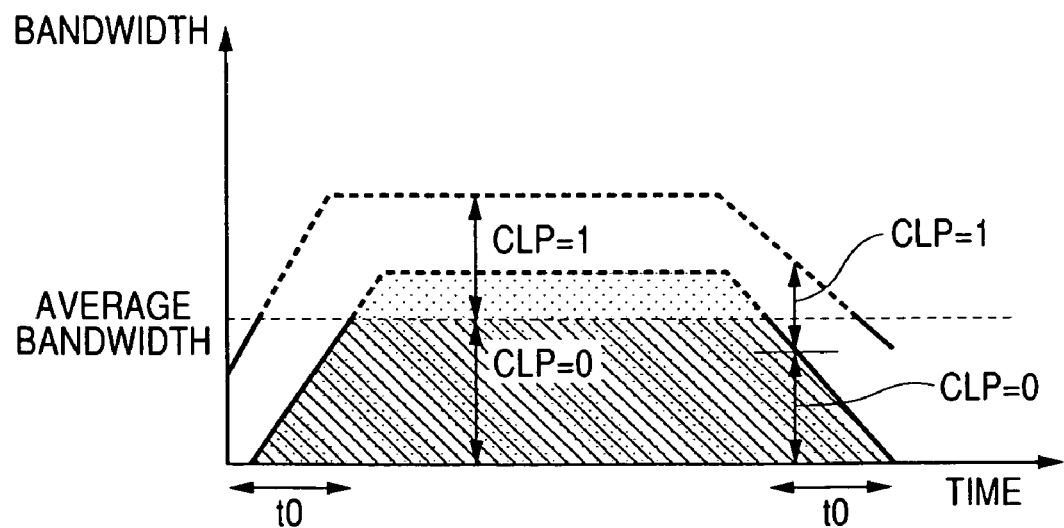
FIG. 16B shows bandwidth variations over time of cells of CLP=0 and of CLP=1 where Prior Art 1 is applied.
Figure 17:
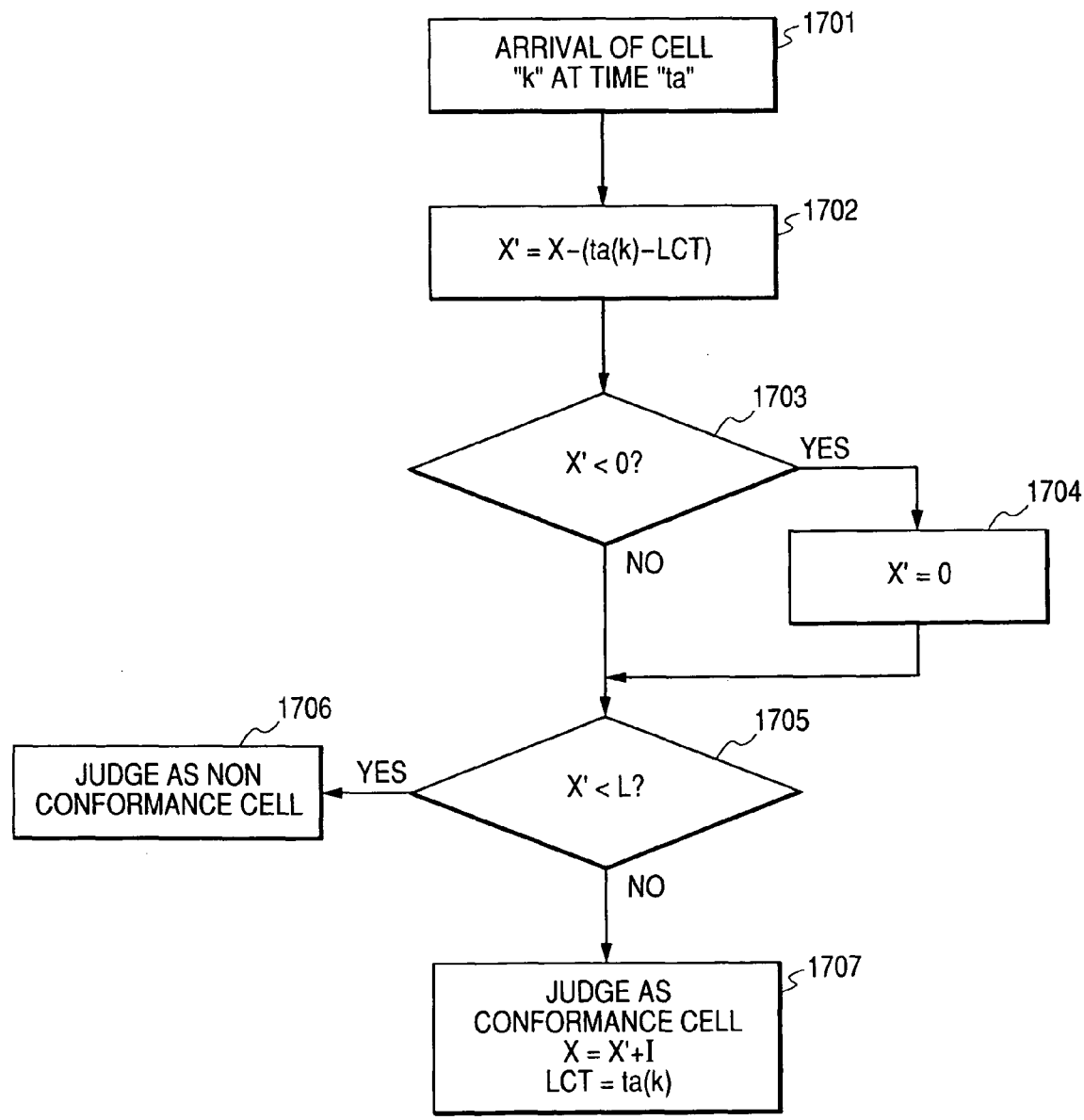
FIG. 17 is a flow chart of a leaky bucket algorithm.

FIG. 15C shows the bandwidth variation over time of priority packets and non-priority packets when the traffic shown in FIG. 15A is monitored by using the policing function according to the invention. W-A and W-B are respectively "2" and "1". When the input bandwidth of important packets is ⅔ of the contract bandwidth or less, as indicated by period t2, unimportant packets for any surplus contract bandwidth are judged as priority packets. On the other hand, when the input bandwidth of important packets is ⅔ of the contract bandwidth or more, ⅔ of the contract bandwidth is occupied by priority packets, the remaining ⅓ is secured as the bandwidth for unimportant packets. Thus, when the bandwidth of unimportant packets is ⅓ of the contract bandwidth or more, unimportant packets corresponding to ⅓ of the contract bandwidth are judged as priority packets as indicated by period t3. As described above, the policing device according to the invention can secure a bandwidth for unimportant packets as well while allocating the contract bandwidth to important packets preferentially.

The above embodiment of the invention was described in the case where two kinds of packets differing in the level of importance are received. It will be appreciated that the allocation of the contract bandwidth among two departments within Enterprise A can be controlled by declaring, to the administrator of the VPN service network 200 in advance, the way of distinguishing the departments and the ratio of bandwidth allocation between them instead of designating a way of distinguishing different importance levels and the ratio of allocation among different importance levels. However, the number of departments in any actual enterprise is more likely to be three or more. In view of this problem, as an example of case in which more than three departments are involved, the policing unit of another embodiment will be described next in the case where the contract bandwidth is shared by four departments.

Figure 11:
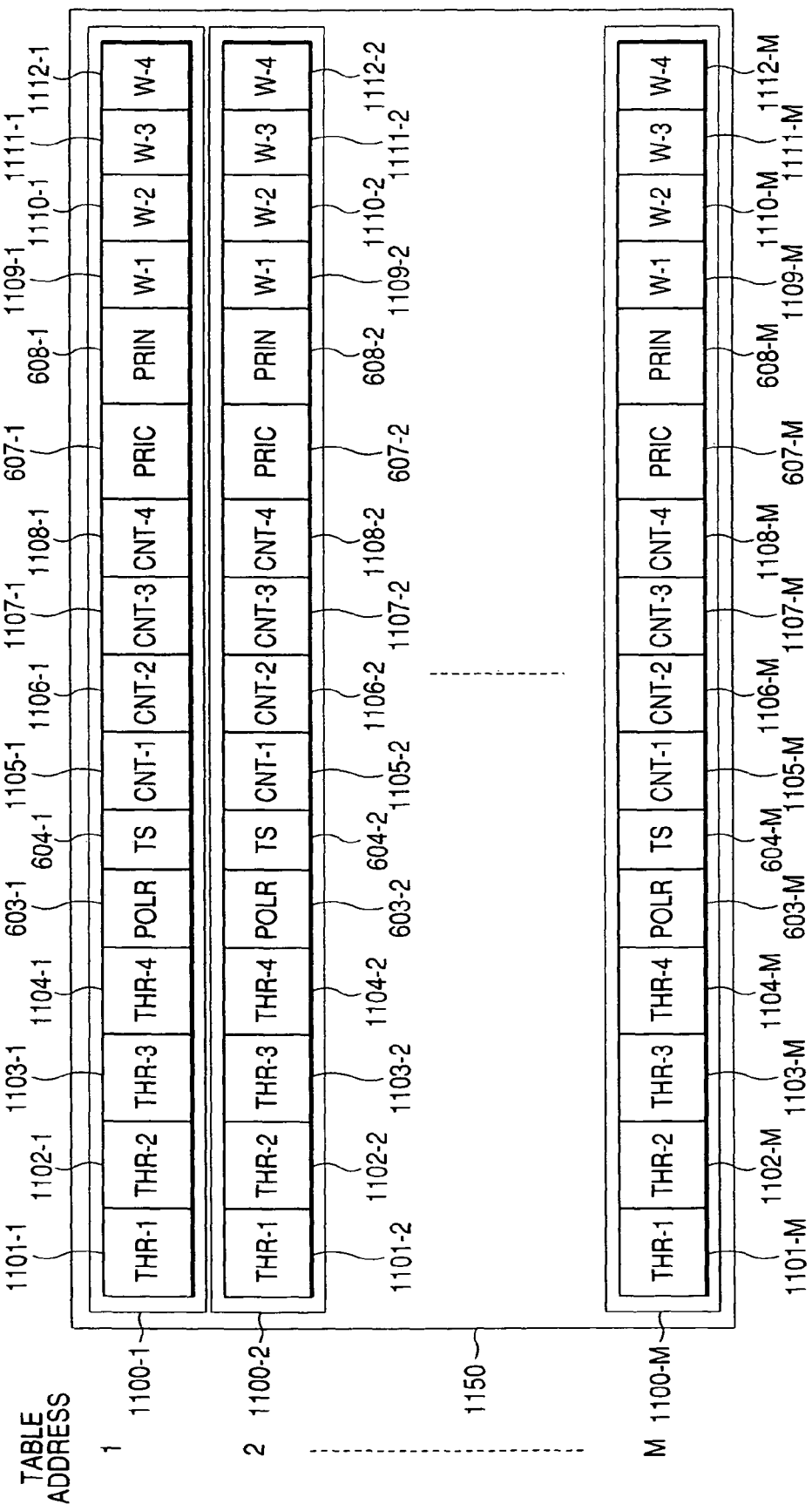
FIG. 11 shows the format of a policing table 1150.

FIG. 11 shows the format of a policing table 1150. Each entry 1100-$j$ in this table includes THR-1: 1101-$j$, THR-2: 1102-$j$, THR-3: 1103-$j$ and THR-4: 11014-$j$ instead of THR-A: 601-$j$ and THR-B: 602-$j$ in the entry 600-$j$ of the policing table 550. It further includes CNT-1: 1105-$j$, CNT-2: 1106-$j$, CNT-3: 1107-$j$ and CNT-4: 1108-$j$ instead of CNT-A: 605-$j$ and CNT-B: 606-$j$ and also includes W-1: 1109-$j$, W-2: 1110-$j$, W-3: 1111-$j$ and W-4: 1112-$j$ instead of W-A: 609-$j$ and W-B: 610-$j$.

Figure 9:
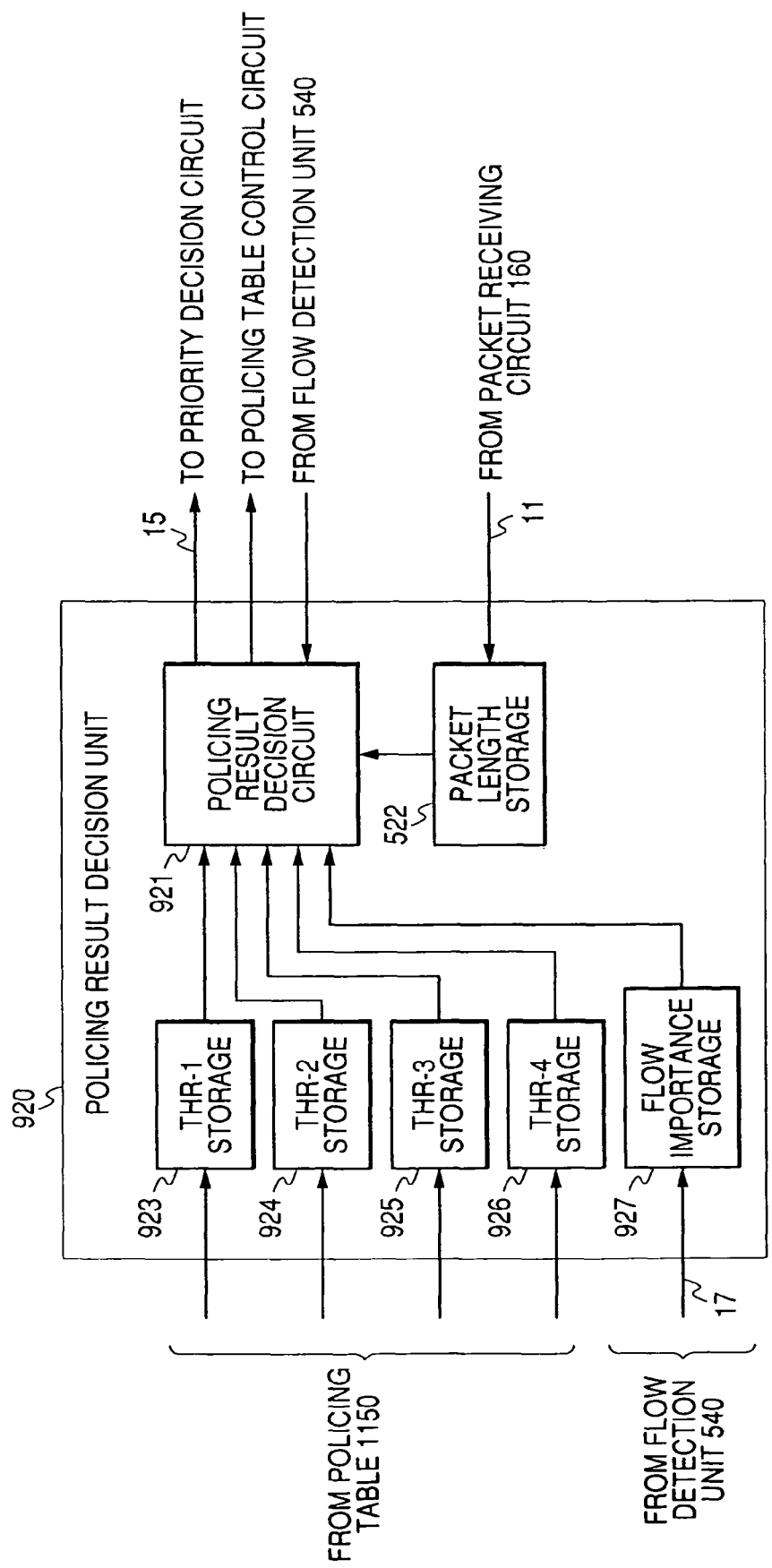
FIG. 9 is a block diagram showing the configuration of a policing result decision unit 920 to which the invention is applied.
Figure 10:
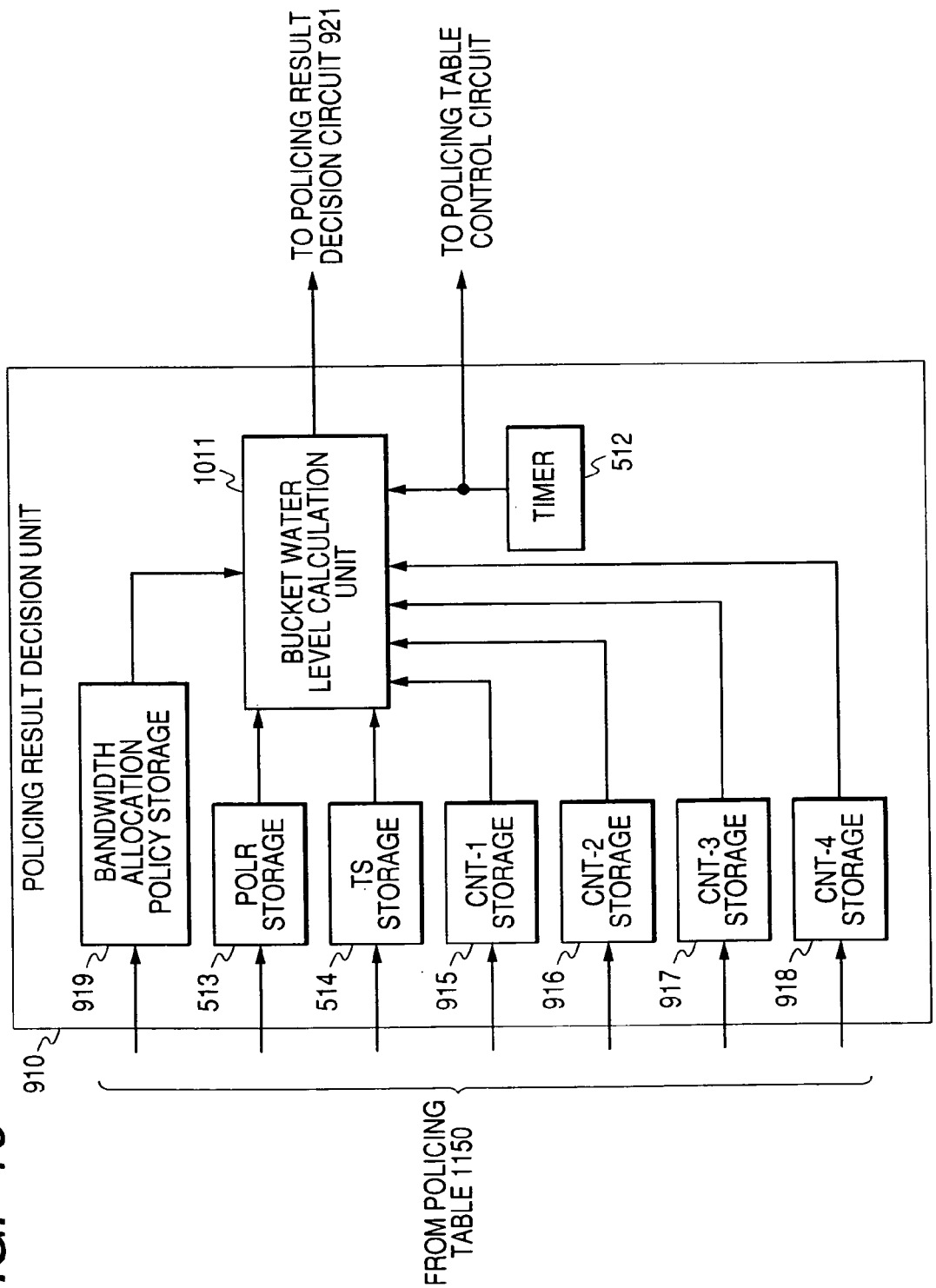
FIG. 10 is a block diagram showing the configuration of a bucket water level decision unit 910 to which the invention is applied.

In connection with these changes in entry contents, as shown in FIG. 9, a policing result decision unit 920 of this embodiment is provided with a THR-1 storage 923, a THR-2 storage 924, a THR-3 storage 925 and a THR-4 storage 926 instead of the THR-A storage 523 and the THR-B storage 524. Further as shown in FIG. 10, a bucket water level decision unit 910 of this embodiment is provided with a CNT-1 storage 915, a CNT-2 storage 916, a CNT-3 storage 917 and a CNT-4 storage 918 instead of the CNT-A storage 515 and the CNT-B storage 516.

In this embodiment, the processes of bandwidth monitoring described with reference to FIG. 7 are altered as follows.

At step 702 in the policing start process 700, the flow detection unit 540 detects the identifier of each department in Enterprise A in accordance with the method of distinguishing different departments having been declared by the contracting user in advance, and transmits the result of detection to a flow importance level storage 927 as flow importance level information 17. Regarding the distinguishment of departments, for instance, the administrator of the enterprise network A may declare to the carrier the IP addresses of the terminals owned by each of the departments, so that the flow detection unit 540 can identify the department of the packet transmission source based on the source IP address of the received packet. At step 703, THR-1: 1101-$j$, THR-2: 1102-$j$, THR-3: 1103-$j$, THR-4: 1104-$j$, CNT-1: 1105-$j$, CNT-2: 1106-$j$, CNT-3: 107-$j$ and CNT-4: 1108-$j$ that have been read out are respectively stored in the THR-1 storage 923, THR-2 storage 924, THR-3 storage 925, THR-4 storage 926, CNT-1 storage 915, CNT-2 storage 916, CNT-3 storage 917 and CNT-4 storage 918. Also, W-1: 1109-$j$, W-2: 1110-$j$, W-3: 1111-$j$ and W-4: 1112-$j$ are stored in a bandwidth allocation policy storage 919.

Figure 12:
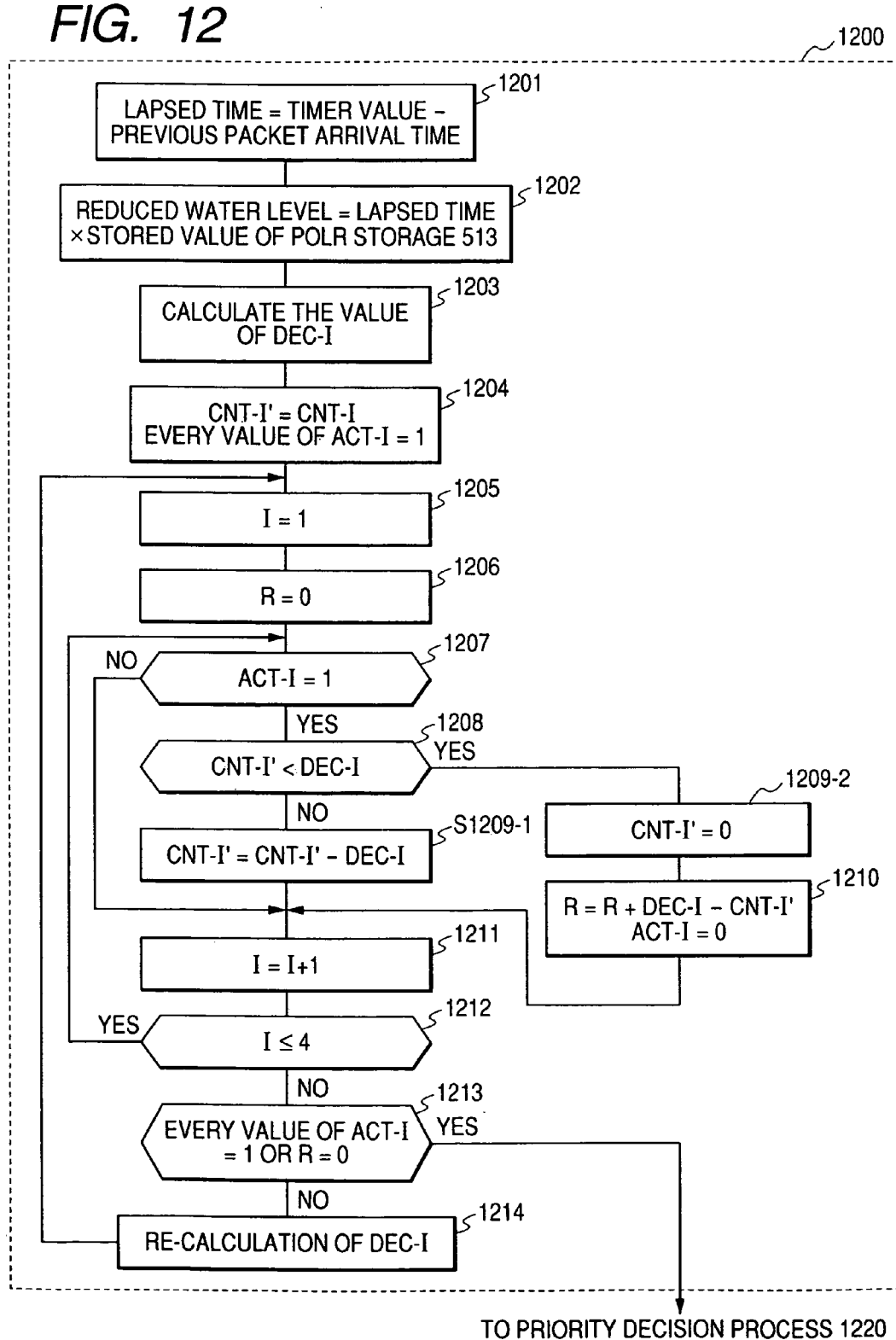
FIG. 12 is a flow chart of a bucket water level calculation process 1210.

FIG. 12 shows a flow chart of a bucket water level calculation process 1200 to be executed in place of the water level calculation process 710 charted in FIG. 7.

At steps 1201 and 1202, processes similar to those at step 711 and 712 are executed, respectively. After that, a bucket water level calculation circuit 1011 calculates, on the basis of bandwidth weights W-1, W-2, W-3 and W-4 for each department in the bandwidth allocation policy storage 919, tentative water levels DEC-I (I=1 to 4) to be subtracted from CNT-1, CNT-2, CNT-3 and CNT-4 (step 1203). In the processes at step 1204 and onward, the water level CNT-I' immediately before the packet is received is calculated according to the relative magnitudes of DEC-I and CNT-I. First at step 1204, CNT-I'=CNT-I being supposed tentatively, the value of ACT-I (active-I), which indicates that each CNT-I' is an object of water level subtraction, is initialized to "1". Next, a parameter I indicating the departmental number in the enterprise is initialized to "1" (step 1205). This parameter I is used for routine processing from step 1207 to 1212. At the next step 1206, a surplus bandwidth R (bit/a) is initialized to "0". "R" indicates the total sum of the surplus bandwidths (CNT-I−DEC-1) of all the departments.

At step 1207, the processing sequence is branched depending on whether ACT-I is "1" or not. If ACT-I is "0" and therefore no subtraction from CNT-I is needed, the departmental number I is altered to I□1 without performing the water level subtraction (step 1211). On the other hand, if ACT-I is "1", it will be judged whether or not all DEC-I can be subtracted from CNT-I' (step 1208). If CNT-I'<DEC-I holds, CNT-I'="0" will be set (step 1209-2), an equivalent of the surplus bandwidth (DEC-I−CNT-I) is added to R, and ACT-I is set to "0" (step 1210). If CNT-I'≧DEC-I holds, CNT-I'=CNT-I'−DEC-I will be set (step 1209-1), and the departmental number I is altered to I□1 (step 1211).

The bucket water level calculation circuit 1011 checks whether or not the steps 1207 through 1211 have been executed for all the departments by comparing I with the number of departments, which is "4" in this case (step 1212). If I≦4 holds and the above steps remain unexecuted for any department, the processing from step 1207 onward is repeated. If I>4 holds and the steps have been executed for all departments, the processing sequence will be branched depending on the values of ACT-I and R (step 1213). If ACT-I is "0" in every case and no water level subtraction is needed for any CNT-I or in the absence of any surplus bandwidth as R is "0", the bucket water level calculation process 1200 will be ended to start a priority level decision process 1220. In all other cases, after calculation DEC-I again on the basis of R and W-I of every department whose ACT-I is "1" (step 1214), the processing sequence returns to step 1205. By repeating the processing of steps 1205 through 1214, the value of every CNT-I' can be calculated.

Figure 13:
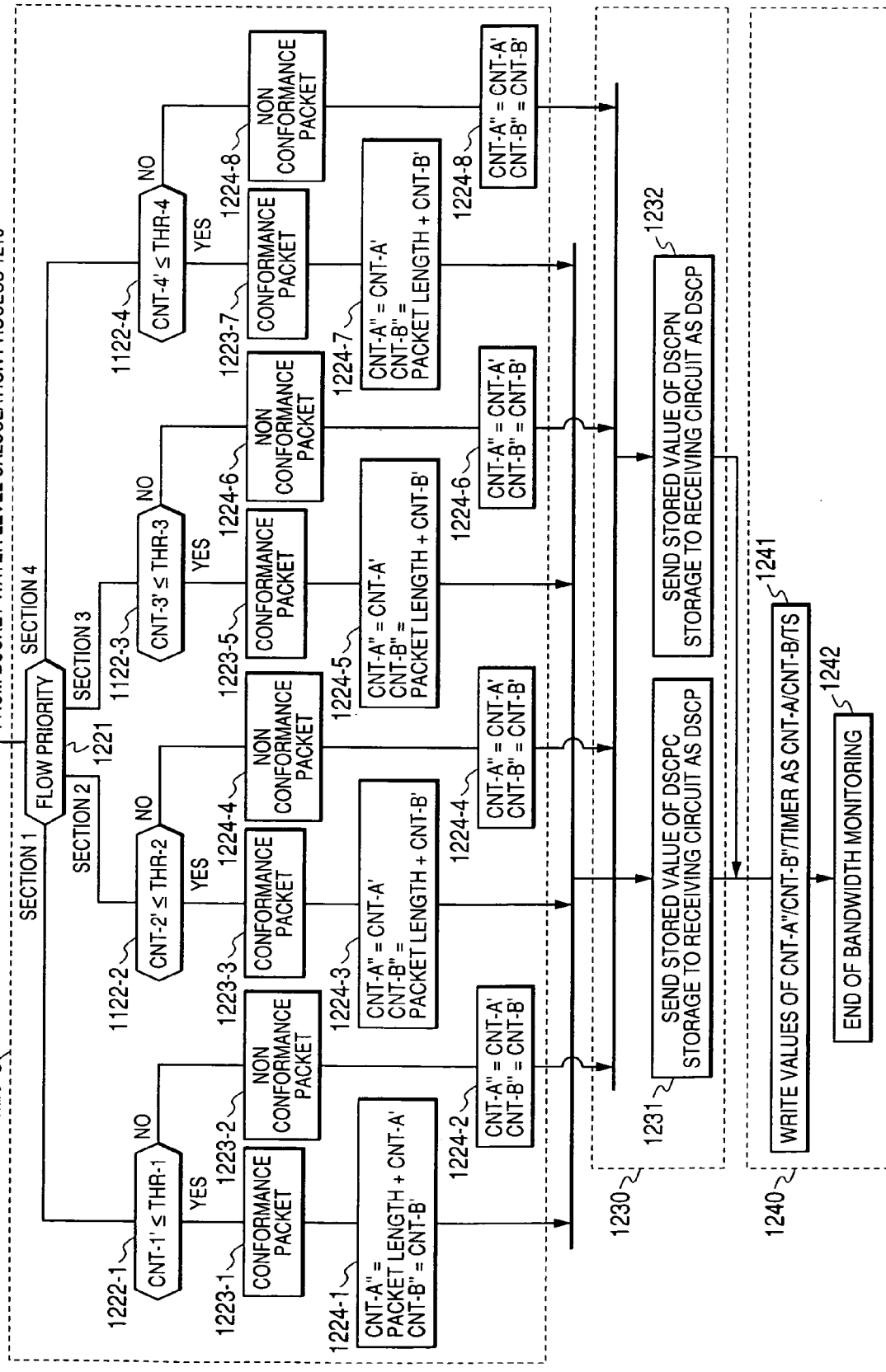
FIG. 13 is a flow chart of a policing result decision process 1220, a priority decision process 1230 and a policing end process 1240.

FIG. 13 shows a flow chart of processes 1220, 1230 and 1240 to be executed in this embodiment in place of the policing result decision process 720, the priority level decision process 730 and the policing end process 740 described with reference to FIG. 8.

In the policing result decision process 1220, judgment as to non-conformance or conformance and judgment regarding CNT-1" through CNT-4" to be written into the policing table 1150 are performed. The priority decision process 1230 is the same as the process 730. The policing end process 1240 is the same as the above-described policing end process 740 except that CNT-1" through CNT-4" are written into the policing table 1150 as CNT1 through CNT4 at step 1241 in place of CNT-A" and CBT-B".

Figure 14:
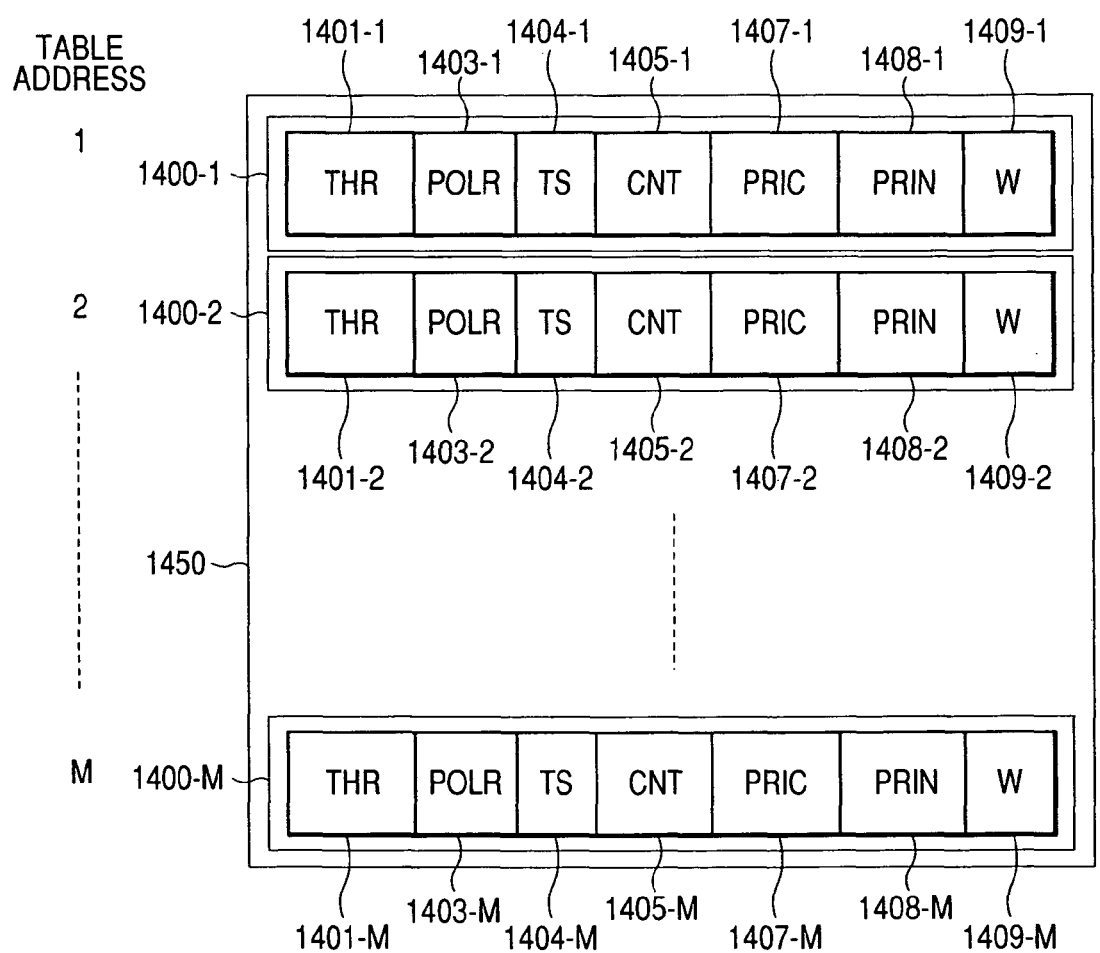
FIG. 14 shows a format of a packet in a policing table 1450.

The policing table 1150, provided with four fields each for THR, CNT and W for each department to make possible monitoring of up to four departments. The numbers of THR, CNT and W in the entry 1100-*j* is the maximum number of departments that can be supported by the VPN service network 200. If the number of departments is approximately equal to the maximum number of departments, virtually every field will be used, but if the number of departments is much smaller than the maximum number of departments, many wasteful THR, CNT and W fields will arise. In view of this problem, in the case where the number of departments is much smaller than the maximum number of departments, entries 1400-*j* of a policing table 1450 shown in FIG. 14 can be used in place of the entries 1100-*j* so that the capacity of the policing table 1150 can be efficiently used.

In this case, one entry 1400-*j* would be needed for the bandwidth monitoring of each department, as many entries 1400-*j* as the number of departments of the contracting user should be made available. Each entry 1400-*j* includes a bucket capacity THR: 1401-*j*, the quantity CNT: 1405-*j* of water stored immediately after the bandwidth monitoring of a given department, and the allocation weight W: 1409-*j*. The entry 1400-*j* further includes POLR: 1403-*j*, TS: 1404-*j*, PRIC: 1407-*j* and PRIN: 1408-*j*. As the values of these fields are the same for every department of a contracting user, in supporting n departments, n−1 fields of POLR: 1403-*j*, TS: 1404-*j*, PRIC: 1407-*j* and PRIN: 1408-*j* become wasteful. Accordingly, this method is more efficient in the use of fields than the entry 1100-*j* in monitoring a small number of departments, but it is less efficient in performing bandwidth monitoring of many departments.

The use of policing table 1450 would entail the following changes in bandwidth monitoring operations.

At step 703, the flow importance level information 17 delivered by the flow detection unit 540 is also received by the policing table control circuit 561, and the address of the policing table 1450 is transmitted so that the entry 1400-*j* for every department of the contracting user can be read out. In the case where the contracting user has four departments, four addresses will be outputted so as to read out four entries 1400-*j*. In each of the THR-1 storage 923, THR-2 storage 924, THR-3 storage 925, THR-4 storage 926, CNT-1 storage 915, CNT-2 storage 916, CNT-3 storage 917 and CNT-4 storage 918, THR: 1401-*j* and CNT: 1405-*j* of the entry 1400-*j* to be stored in each storage are stored, an W: 1409-*j* for every department is stored in the bandwidth allocation policy storage 919.

In the POLR storage 513, TS storage 514, PRIC storage 532 and PRIN storage 533, POLR: 1403-*j*, TS: 1404-*j*, PRIC: 1407-*j* and PRIN: 1408-*j* in only one arbitrary entry 1400-*j* are stored. Since these values are the same for every entry 1400-*j* of a contracting user, information in any entry 1400-*j* accompanying the same contracting user can as well be stored. Further in the writing of CNT and TS at step 1241, the policing table control circuit 561 rewrites appropriate fields in the entry 1400-*j* read out at step 703 of FIG. 7.

As is evident from the foregoing description of the embodiments, a policing device according to the present invention can control the ratio between importance levels in the bandwidth of priority packets while collectively monitoring a plurality of bandwidths differing in the level of importance and judging packets of a certain monitored bandwidth as conformant. As a result, the policing device according to the invention can secure a bandwidth for priority packets at every importance level. For instance, if the allocation weights of important packets and of unimportant packets set to "2" and "1", respectively, ⅔ and ⅓ of the contract bandwidth can be secured for important packets and unimportant packets, respectively.

Furthermore, a policing device according to the invention can control the ratio among different departments as to the bandwidth of priority packets while collectively monitoring a plurality of bandwidths and judging packets of a certain monitored bandwidth as conformant. For this reason, the policing device can secure the priority packet bandwidth for every department.

What is claimed is:

1. A policing device for transferring packets received from an input line to an output line, the device comprising:
 a monitoring unit that monitors a bandwidth of an input packet received from the input line for each of a plurality of packet flows; and
 a decision unit that performs a judgment of whether each input packet was received within a predetermined monitoring bandwidth assigned to the packet flow of the input packet, determines each input packet received within the monitoring bandwidth for the packet flow of the input packet as a conformance packet and each input packet received over the monitoring bandwidth for the packet flow of the input packet as a non-conformance packet, receives a command indicating allocation weights of a plurality of classes predefined for each packet flow from an external management terminal, stores the allocation weights in association with the classes for each packet flow, and judges whether each received input packet was received within a divisional bandwidth weighted with the allocation weight associated with a specific class of the packet flow to which the input packet belongs.

2. The policing device according to claim 1, further comprising a priority control unit for assigning a forwarding priority to each received input packet in accordance with a result of the judgment performed for the input packet by the decision unit such that the input packet is transferred according to the forwarding priority.

3. The policing device according to claim 2, wherein the decision unit judges whether each input packet determined to be a non-conformance packet was received within the divisional bandwidth weighted with the allocation weight associated with a specific class of the packet flow to which the input packet belongs, and the priority control unit assigns the forwarding priority to the input packet in accordance with the judgment of whether the input packet was received within the divisional bandwidth based on the divisional bandwidth of the specific class of the packet flow to which the input packet belongs.

4. The policing device according to claim 1, wherein the command received from the external management terminal for a packet flow indicates a limit value of a counter for detecting a current bandwidth for each class for the packet flow, and wherein the decision unit judges whether each received input packet for the packet flow was received within the divisional bandwidth weighted with the allocation weight associated with the specific class of the packet flow to which the input packet belongs by using the limit value when the monitoring unit has detected the input packet to be a non-conformance packet.

5. The policing device according to claim 1, wherein the divisional bandwidth for each class of each packet flow is calculated by ratio of the allocation weight of the class to those of each other class of the packet flow to be monitored.

* * * * *